United States Patent
Bhatnagar et al.

(10) Patent No.: US 12,219,666 B2
(45) Date of Patent: Feb. 4, 2025

(54) COORDINATED TESTING OF GROUPS OF PROXIMATE ACCESS POINTS IN A NETWORK

(71) Applicant: Ruckus IP Holdings LLC, Claremont, NC (US)

(72) Inventors: Hemant Bhatnagar, Cupertino, CA (US); Rajiv Ramnath Iyer, Los Altos, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 347 days.

(21) Appl. No.: 17/891,270

(22) Filed: Aug. 19, 2022

(65) Prior Publication Data

US 2023/0066262 A1    Mar. 2, 2023

Related U.S. Application Data

(60) Provisional application No. 63/238,327, filed on Aug. 30, 2021.

(51) Int. Cl.
*H04W 88/08* (2009.01)
*H04W 24/06* (2009.01)

(52) U.S. Cl.
CPC ........... *H04W 88/08* (2013.01); *H04W 24/06* (2013.01)

(58) Field of Classification Search
CPC ..... H04W 24/00; H04W 24/06; H04W 24/08; H04W 24/10; H04W 88/08
See application file for complete search history.

(56) References Cited

U.S. PATENT DOCUMENTS

| 2017/0085437 A1* | 3/2017 | Condeixa | H04L 43/06 |
| 2021/0337413 A1* | 10/2021 | Rumsby | H04L 5/0037 |
| 2022/0140919 A1* | 5/2022 | Linkola | H04B 17/103 370/329 |

* cited by examiner

*Primary Examiner* — Khoa Huynh
(74) *Attorney, Agent, or Firm* — Steven Stupp

(57) ABSTRACT

An access point may receive, associated with a computer, information that specifies a group of access points in a network, where the group includes the access point, a second access point and/or a third access point, and the group of access points are proximate to each other. Then, the access point may receive, associated with the computer, instructions for testing to conduct with the second access point or the second access point and the third access point, where the testing involves wired communication with the second access point, and wireless communication with the second access point or the third access point. Next, the access point may perform, based at least in part on the instructions, the testing with the second access point or the second access point and the third access point. Moreover, the access point may provide, addressed to the computer, test results associated with the access point.

20 Claims, 9 Drawing Sheets

SERVICE VALIDATION > SERVICE VALIDATION TEST REPORT

TEST
APs UNDER TEST: 7 AP | TEST RESULT: 14.29% PASS | WLAN: MSB_SSID | RADIO BAND: 5 GHz | AUTHENTICATION TECHNIQUE: WPA2-PERSONAL

TEST TIME: APRIL 13 2021 10:46:40

| OVERVIEW | DETAILS |

| AP NAME | AP MAC | 802.11 AUTH. | ASSOC. | PSK | DHCP | DNS | PING | TRACEROUTE | UPLOAD | DOWNLOAD |
|---|---|---|---|---|---|---|---|---|---|---|
| AP 1 | MAC 1 | ERROR | ERROR | ERROR | ERROR | ERROR | ERROR | ERROR | ERROR | ERROR |
| AP 2 | MAC 2 | ERROR | ERROR | ERROR | ERROR | ERROR | ERROR | ERROR | ERROR | ERROR |
| AP 3 | MAC 3 | ERROR | ERROR | ERROR | ERROR | ERROR | ERROR | ERROR | ERROR | ERROR |
| AP 4 | MAC 4 | ERROR | ERROR | ERROR | ERROR | ERROR | ERROR | ERROR | ERROR | ERROR |
| AP 5 | MAC 5 | ERROR | ERROR | ERROR | ERROR | ERROR | ERROR | ERROR | ERROR | ERROR |
| AP 6 | MAC 6 | ERROR | ERROR | ERROR | ERROR | ERROR | ERROR | ERROR | ERROR | ERROR |
| AP 7 | MAC 7 | PASS | PASS | PASS | PASS | PASS | 39.4 ms | PASS | 22.5 Mbps | 58.1 Mbps |

FIG. 6

TEST REPORT

TEST
APs UNDER TEST: 2 AP | TEST RESULT: 100% PASS | WLAN: KRF67 | RADIO BAND: 5 GHz | AUTHENTICATION TECHNIQUE: WPA2-PERSONAL | TEST TIME: MARCH 29 2021 12:27:39

OVERVIEW

DETAILS

| AP NAME | AP MAC | 802.11 AUTH. | ASSOC. | PSK | DHCP | DNS | PING | TRACEROUTE | UPLOAD | DOWNLOAD |
|---|---|---|---|---|---|---|---|---|---|---|
| AP 1 | MAC 1 | PASS | PASS | PASS | PASS | PASS | 21.7 Mbps | ... | 44 Mbps | 64.4 Mbps |
| AP 2 | MAC 2 | PASS | PASS | PASS | PASS | PASS | 39.2 Mbps | ... | 45.8Mbps | 57.8 Mbps |

FIG. 8

COORDINATED TESTING OF GROUPS OF PROXIMATE ACCESS POINTS IN A NETWORK

CROSS REFERENCE TO RELATED APPLICATIONS

This application claims priority under 35 U.S.C. 119(e) to U.S. Provisional Application Ser. No. 63/238,327, "Coordinated Testing of Groups of Proximate Access Points in a Network," filed on Aug. 30, 2021, by Hemant Bhatnagar, et al., the contents of which are herein incorporated by reference.

FIELD

The described embodiments relate to techniques for testing groups of access points that are proximate to each other in a network.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

It can be difficult to determine the cause and then address communication problems in a network. Notably, when a communication problem occurs (such as reduced throughput), a customer typically contacts customer support for help. In principle, there are a wide variety of potential cause of the customer's communication problem. For example, the cause of the communication problem may be associated with wireless communication and/or wired communication. Moreover, the cause of the communication problem may be associated with hardware and/or software. In order to diagnose the customer's communication problem, which is enabling for subsequent remedial action, typically customer support asks the customer to conduct different field tests.

However, this approach to problem solving usually depends on the customer's availability and cooperation. Moreover, the field testing is often time consuming, cumbersome and expensive. For example, additional human, hardware and software resources are needed during the field testing, and the customer typically needed to approve network access for the field testing. Consequently, this manual approach to problem solving is frustrating for customers.

SUMMARY

An access point that selectively performs testing is described. This access point may include an interface circuit that communicates with a computer (such as a controller) and a second access point using a wired communication protocol, and a second interface circuit the communicates with the second access point or a third access point using a wireless communication protocol. During operation, the access point may receive, associated with the computer, information that specifies a group of access points in a network, where the group includes the access point, the second access point and/or the third access point. Note that the group of access points are proximate to each other in the network (e.g., the second access point or the third access point may be within wireless-communication range of the access point and/or the group of access points may share a switch in the network, a router in the network and/or the controller). Then, the access point may receive, associated with the computer, instructions for the testing to conduct with the second access point or the second access point and the third access point, where the testing involves wired communication with the second access point, and wireless communication with the second access point or the third access point. Next, the access point may perform, based at least in part on the information and the instructions, the testing with the second access point or the second access point and the third access point. Moreover, the access point may provide, addressed to the computer, test results associated with the access point.

Moreover, the access point may: receive second test results associated with the second access point or the third access point, and provide, addressed to the computer, the second test results. In these embodiments, the instructions may specify that the second test results are to be reported to the access point.

Furthermore, the testing may be performed in an automated manner (e.g., without human involvement).

In some embodiments, the access point may receive, associated with a second computer, a trigger that initiates the testing. Alternatively, the access point may receive, associated with the computer, a trigger that initiates the testing.

Note that the testing may include: communication performance using the wireless communication protocol (such as a wireless communication protocol that is compatible with IEEE 802.11); authentication testing; association testing; dynamic host control protocol (DHCP) testing; user-authentication testing; or domain name system (DNS) testing.

Moreover, during the testing that involves wireless communication with the second access point or the third access point, the access point may associate with the second access point or the third access point. When associated, the second access point or the third access point may be a client of the access point.

Another embodiment provides the second access point or the third access point.

Another embodiment provides the controller.

Another embodiment provides the computer or the second computer.

Another embodiment provides a computer-readable storage medium with program instructions for use with one of the aforementioned components. When executed by the component, the program instructions cause the component to perform at least some of the aforementioned operations in one or more of the preceding embodiments.

Another embodiment provides a method, which may be performed by the one of the aforementioned components. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 6 is a drawing illustrating an example of a test-result user interface in accordance with an embodiment of the present disclosure.

FIG. 8 is a drawing illustrating an example of a test-result user interface in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
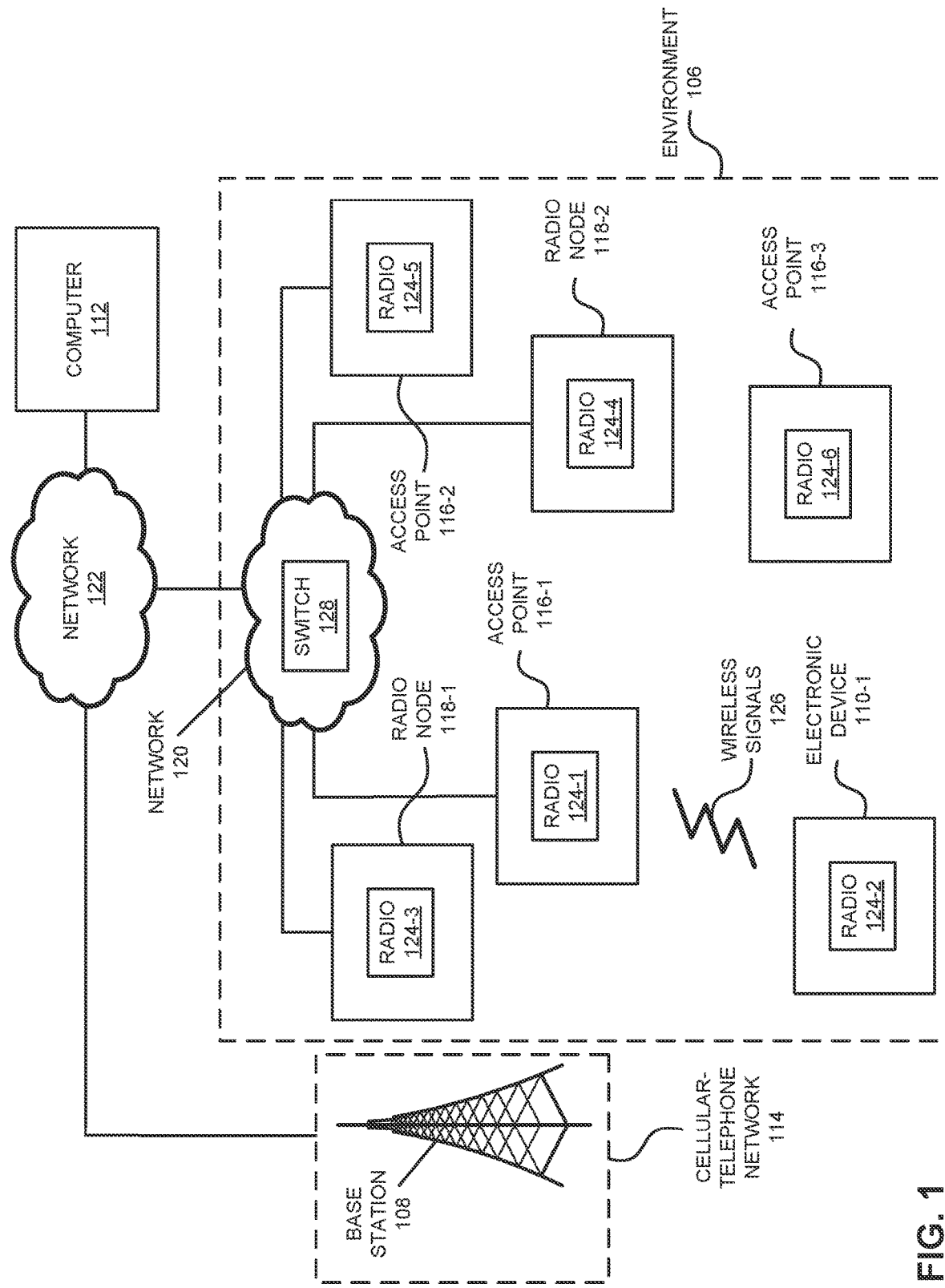
FIG. 1 is a block diagram illustrating an example of communication among electronic devices in accordance with an embodiment of the present disclosure.

An access point that selectively performs testing is described. During operation, the access point may receive, associated with a computer (such as a controller), information that specifies a group of access points in a network, where the group includes the access point, a second access point and/or a third access point. Note that the group of access points are proximate to each other in the network (e.g., the second access point or the third access point may be within wireless-communication range of the access point and/or the group of access points may share a switch in the network, a router in the network and/or the controller). Then, the access point may receive, associated with the computer, instructions for the testing to conduct with the second access point or the second access point and the third access point, where the testing involves wired communication with the second access point, and wireless communication with the second access point or the third access point. Next, the access point may perform, based at least in part on the information and the instructions, the testing with the second access point or the second access point and the third access point. Moreover, the access point may provide, addressed to the computer, test results associated with the access point.

By selectively performing the testing, these communication techniques may provide improved testing. Notably, the communication techniques may allow the testing to be performed in an automated manner (e.g., with reduced or no human involvement). Moreover, the communication techniques may reduce the time, complexity and expense of the testing. Consequently, the communication techniques may simplify and reduce the time needed to diagnose and address communication problems in the network. These capabilities may improve the communication performance of the network, which may improve the user experience when using the network, and may make it easier to manage and maintain the network.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or computer 112 (which may be a local or a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Figure 9:
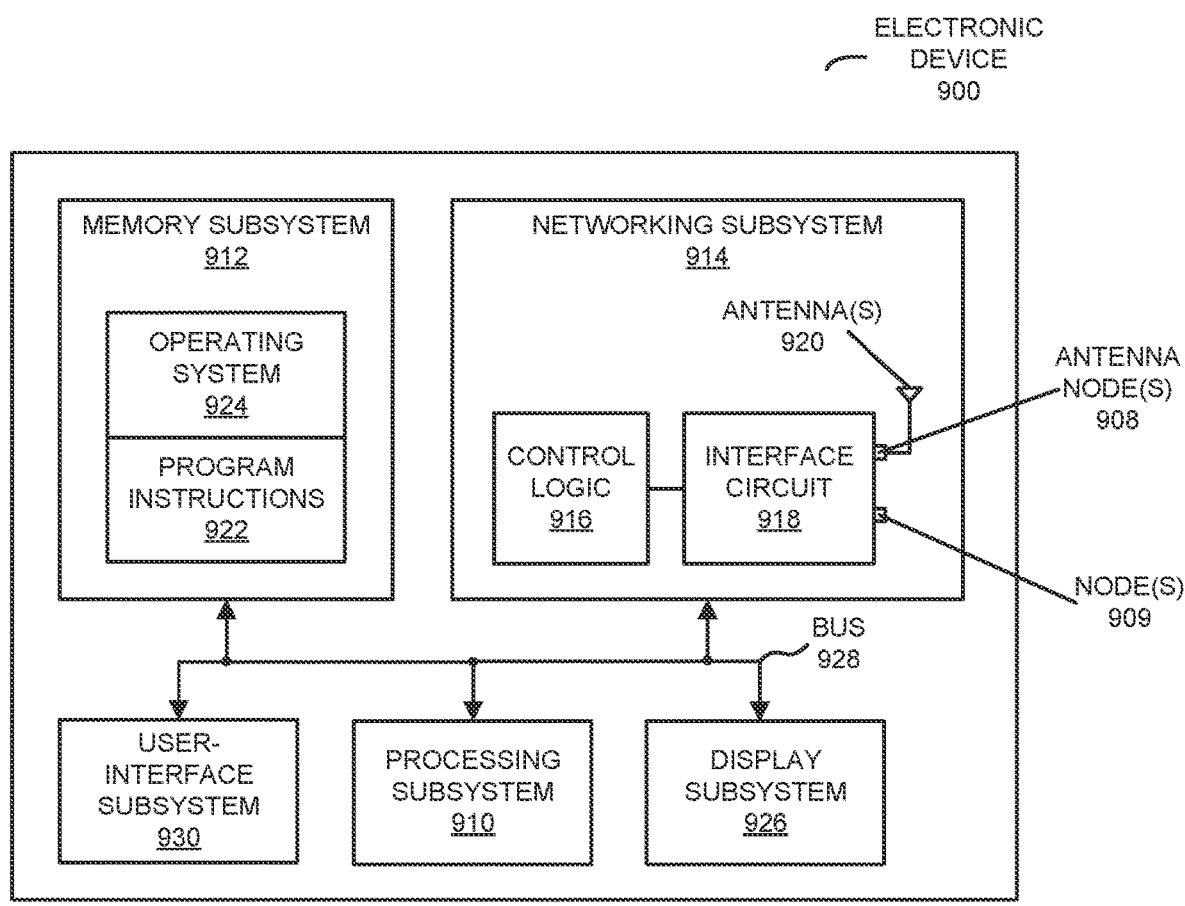
FIG. 9 is a block diagram illustrating an example of an electronic device in accordance with an embodiment of the present disclosure.

As described further below with reference to FIG. 9, electronic devices 110, computer 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be time-consuming and expensive to determine the cause and then address communication problems in a network. Moreover, in order to diagnose and address a customer's communication problem (e.g., with access point 116-1), different field tests often need to be performed, which usually depends on the customer's availability and cooperation.

As described further below with reference to FIGS. 2-8, in order to addresses these difficulties, at least access point 116-1 may selectively perform testing. Notably, computer 112 (which may be a controller of access points 116) may provide information to at least access point 116-1 that specifies a group of access points in a network, such as access point 116-1, access point 116-2 and/or access point 116-3. Note that the group of access points are proximate to each other in the network. For example, access points 116 may be within wireless-communication range of access point 116-1. Alternatively or additionally, the group of access points may share a switch in the network, a router in the network and/or computer 112. Then, computer 112 may provide to at least access point 116-1 instructions for the testing to conduct with access point 116-2 or access points 116-2 and 116-3, where the testing involves wired communication with access point 116-2, and wireless communication with access point 116-2 or access point 116-3. In some embodiments, computer 112 or another computer (not shown) provides a trigger to at least access point 116-1 that initiates the testing. Thus, the testing may be conducted in a centralized manner (controlled by computer 112) or a distributed manner (controlled by one or more of access points 16).

Next, access point 116-1 may perform, based at least in part on the information and the instructions, the testing with access point 116-2 or access points 116-2 and 116-3. Moreover, access point 116-1 may provide to computer 112 test results associated with access point 116-1. Note that the testing may include: communication performance using the wireless communication protocol (such as a wireless communication protocol that is compatible with IEEE 802.11); authentication testing; association testing; DHCP testing; user-authentication testing; and/or DNS testing. In some embodiments, during the testing that involves wireless communication with access point 116-2 or 116-3, access point 116-1 may associate with access point 116-2 or 116-3. When associated, access point 116-2 or 116-3 may be a client of access point 116-1.

In some embodiments, one or more of access points 116 in the group of access points other than access point 116-1 may perform additional testing and provide, directly or indirectly, additional test results to computer 1121. In these embodiments, the instructions may also be provided by computer 112 to the one or more other access points (such as access point 116-2). For example, access point 116-1 may; receive second test results from access point 116-2 and/or 116-3; and provide to computer 112, the second test results. In these embodiments, the instructions may specify that the second test results are to be reported to access point 116-1. Alternatively or additionally, the one or more other access points (such as access point 116-2) may provide the second test results to computer 112.

Note that the testing may be performed in an automated manner (e.g., without human involvement).

In these ways, the communication techniques may allow access points 116 in the group of access points to automatically (e.g., without human involvement) perform testing and report test results, which may be used to diagnose and address one or more communication problems in or associated with the network. Consequently, the communication techniques may reduce the time, expense and complexity associated with the testing and remediation of the one or more communication problems, and may eliminate the need for customer availability and cooperation during these operations.

We now describe embodiments of the method.

Figure 2:
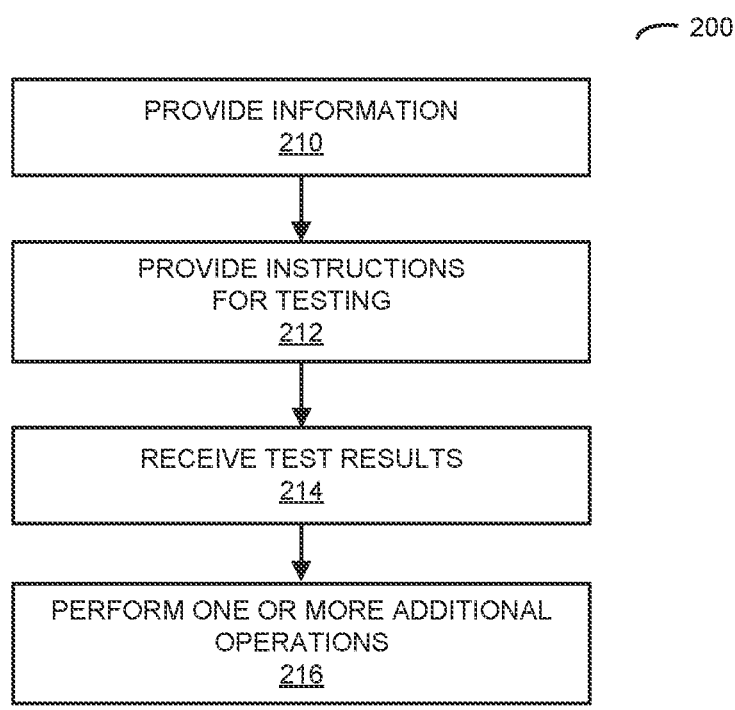
FIG. 2 is a flow diagram illustrating an example of a method for selectively performing testing using a computer in FIG. 1 in accordance with an embodiment of the present disclosure.

FIG. 2 presents a flow diagram illustrating an example of a method 200 for selectively performing testing, which may be performed by a computer (such as computer 112, which may be a controller of at least an access point). During operation, the computer may provide, addressed to or intended for at least the access point, information (operation 210) specifying a group of access points in a network, where the group of access points includes the access point, a second access point and/or a third access point. Note that the group of access points may be proximate to each other in the network (e.g., the second access point or the third access point may be within wireless-communication range of the access point and/or the group of access points may share a switch in the network, a router in the network and/or the controller).

Then, the computer may provide, addressed to or intended for at least the access point, instructions for the testing (operation 212) to conduct with the second access point or the second access point and the third access point, where the testing involves wired communication with the second access point, and wireless communication with the second access point or the third access point. Note that the testing may include: communication performance using the wireless communication protocol (such as a wireless communication protocol that is compatible with IEEE 802.11); authentication testing; association testing; DHCP testing; user-authentication testing; or DNS testing.

Next, the computer may receive, associated with or from the access point, test results (operation 214) associated with the access point.

In some embodiments, the computer optionally performs one or more additional operations (operation 216). For example, the computer may provide, addressed to or intended for the second access point and/or the third access point, information specifying the group of access points. Moreover, the computer may provide, addressed to or intended for the second access point and/or the third access point, the instructions or second instructions for the testing to conduct with the access point.

Furthermore, the computer may receive, associated with or from the access point, second test results associated with the second access point and/or the third access point. In these embodiments, the instructions or the second instructions may specify that the second test results are to be reported to the access point.

Alternatively or additionally, the computer may receive, associated with or from the second access point and/or the third access point, second test results associated with the second access point and/or the third access point.

In some embodiments, the computer may provide, addressed to one or more of the group of access points, one or more triggers that initiates the testing.

After receiving the test results and/or the second test results, the computer may determine or diagnose a communication problem in the network based at least in part on the test results and/or the second test results. Moreover, the computer may perform a remedial action (such as repairing the communication problem, modifying a configuration of one or more computer network devices in or associated with the network, providing a report or an alert, etc.) based at least in part on the test results, the second test results and/or the diagnosed communication problem.

Figure 3:
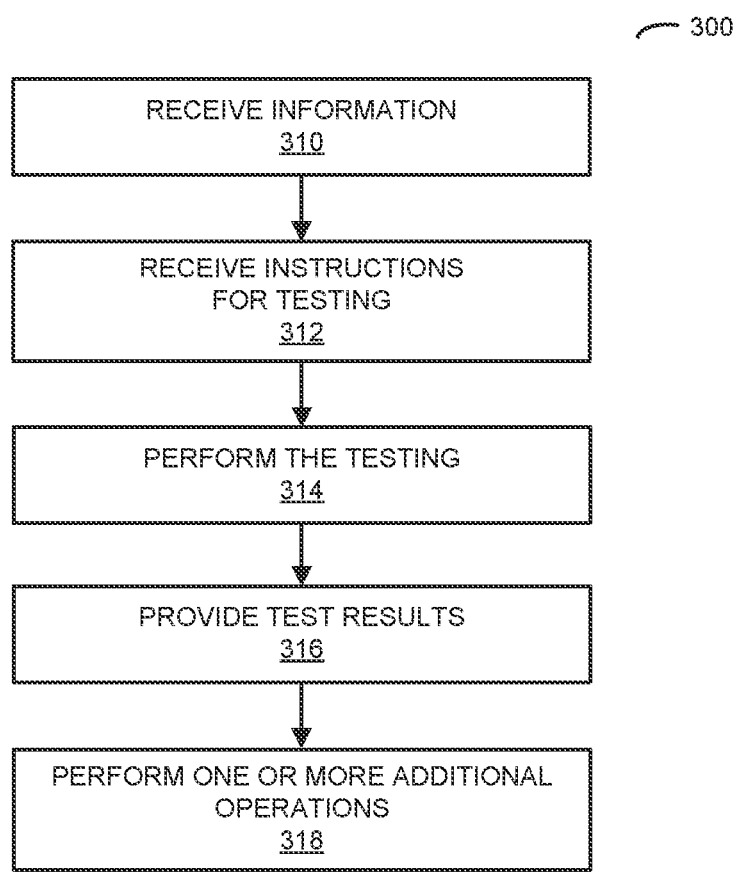
FIG. 3 is a flow diagram illustrating an example of a method for selectively performing testing using an access point in FIG. 1 in accordance with an embodiment of the present disclosure.

FIG. 3 presents a flow diagram illustrating an example of a method 300 for selectively performing testing, which may be performed by an access point (such as one of access points 116 and, more generally, a computer network device, such as one of radio nodes 118 or switch 128 in FIG. 1). During operation, the access point may receive, associated with or from a computer (such as a controller of at least the access point), information (operation 310) that specifies a group of access points in a network, where the group includes the access point, a second access point and/or a third access point. Note that the group of access points may be proximate to each other in the network (e.g., the second access point or the third access point may be within wireless-communication range of the access point and/or the group of access points may share a switch in the network, a router in the network and/or the controller).

Then, the access point may receive, associated with or from the computer, instructions for the testing (operation 312) to conduct with the second access point or the second access point and the third access point, where the testing involves wired communication with the second access point, and wireless communication with the second access point or the third access point. Note that the testing may include: communication performance using the wireless communication protocol (such as a wireless communication protocol that is compatible with IEEE 802.11); authentication testing; association testing; DHCP testing; user-authentication testing; or DNS testing.

Next, the access point may perform, based at least in part on the information and the instructions, the testing (operation 314) with the second access point or the second access point and the third access point. Moreover, the access point may provide, addressed to or intended for the computer, test results (operation 316) associated with the access point.

In some embodiments, the access point optionally performs one or more additional operations (operation 318). For example, the access point may: receive second test results associated with or from the second access point or the third access point, and provide, addressed to or intended for the computer, the second test results. Note that the instructions may specify that the second test results are to be reported to the access point.

Moreover, the access point may receive, associated with or from the computer or a second computer, a trigger that initiates the testing.

Furthermore, during the testing that involves wireless communication with the second access point or the third access point, the access point may associate with the second access point or the third access point. When associated, the second access point or the third access point may be a client of the access point.

Additionally, the testing may be performed in an automated manner (e.g., without human involvement).

In some embodiments of method 200 (FIG. 2) and/or 300, there may be additional or fewer operations. Furthermore, the order of the operations may be changed, and/or two or more operations may be combined into a single operation.

Figure 4:
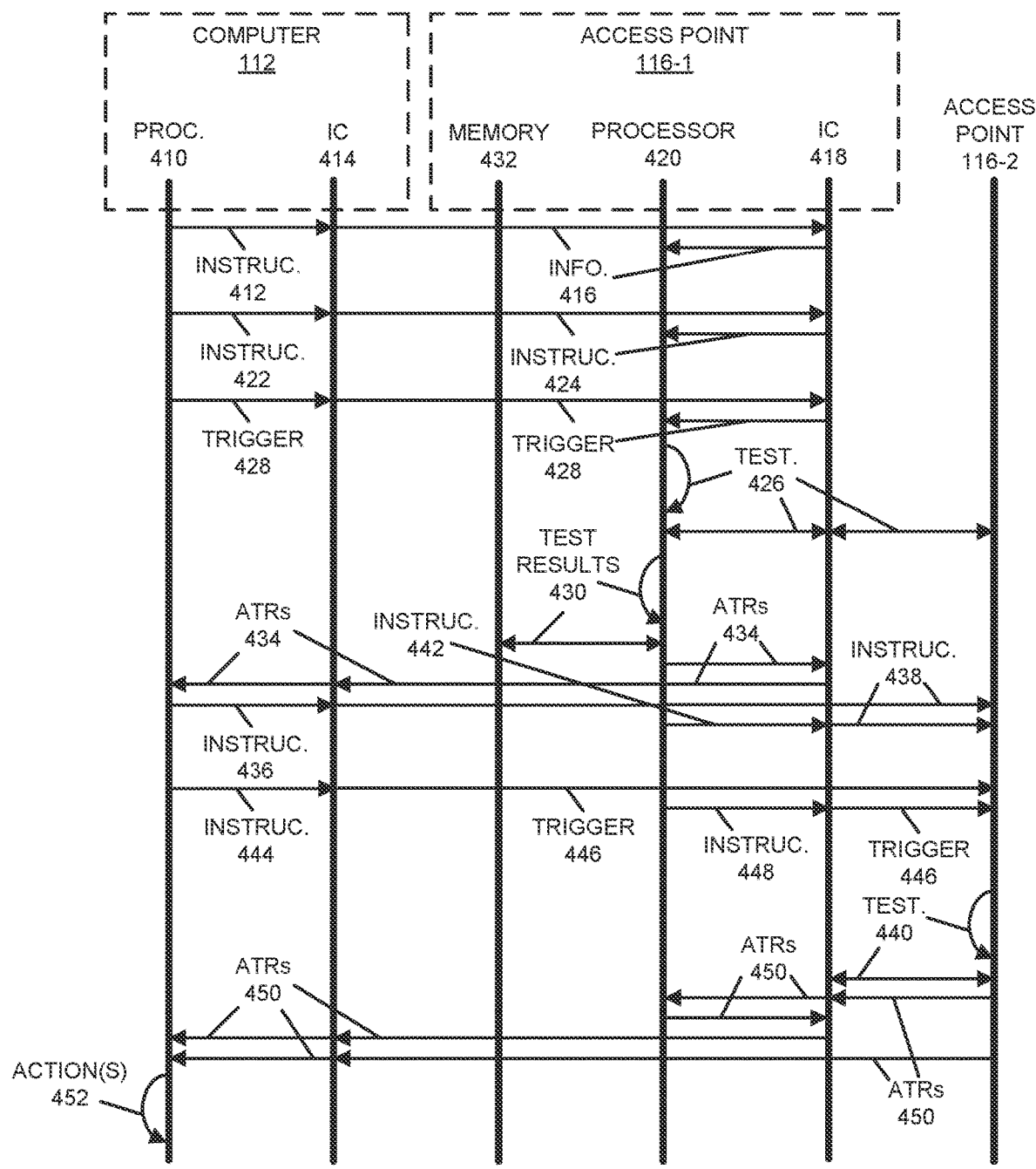
FIG. 4 is a drawing illustrating an example of communication among a computer and a group of access points in FIG. 1 in accordance with an embodiment of the present disclosure.

Embodiments of the communication techniques are further illustrated in FIG. 4, which presents a drawing illustrating an example of communication among computer 112 and access points 116. In FIG. 4, in response to a reported problem in a network, a processor 410 in computer 112 may instruct 412 an interface circuit (IC) 414 in computer 112 to provide information 416 that specifies a group of access points in the network to access point 116-1. Note that the group of access points may include at least access points 116-1 and 116-2, which may be proximate to each other in the network. For example, 'proximate' access points or electronic devices in the network may be within wireless communication range of each other, may be connected to a common switch in the network and/or may be included in the same subnet in the network. After receiving information 416, an interface circuit 418 in access point 116-1 may provide information 416 to a processor 420 in access point 116-1.

Then, processor 410 may instruct 422 interface circuit 414 to provide instruction 424 to access point 116-1 for testing 426 to conduct with access point 116-2, where the testing involves wired and wireless communication with access point 116-2. For example, testing 426 may assess throughput and/or communication-performance testing. After receiving instruction 424, interface circuit 418 may provide instruction 424 to processor 420. In response, processor 420 perform, via interface circuit 418, testing 426 with access point 116-2. In some embodiments, computer 112 provides an optional trigger 428 to access point 116-1 to initiate testing 426. However, in other embodiments, processor 420 initiates testing 426 without trigger 428 from computer 112.

Moreover, processor 420 may collect test results 430 for testing 426, which are stored in memory 432 in access point 116-1. During or after testing 426, processor 420 may instruct interface circuit 418 to provide aggregated test results (ATRs) 434 to access point 116-1.

Furthermore, processor 410 may optionally instruct 436 interface circuit 414 to provide instructions 438 to access point 116-2 for testing 440 to conduct with access point 116-1, where the testing involves wired and/or wireless communication with access point 116-1. Alternatively processor 420 may instruct 442 interface circuit 118 to provide instructions 438 to access point 116-2.

In some embodiments, processor 410 may instruct 444 interface circuit 414 to provide trigger 446 to access point 116-2 to initiate testing 440, such as throughput and/or communication-performance testing. Alternatively, processor 420 may instruct 448 interface circuit 418 to provide trigger 446 to access point 116-2. After receiving trigger 446, access point 116-2 may perform testing 440 and, during or after testing 440, may provide aggregate test results (ATRs) 450 to access point 116-1 or to computer 112 based at least in part on instructions 438. In embodiments where aggregate test results 450 are provided to access point 116-1, processor 420 may forward, via interface circuit 418, aggregate test results 450 to computer 112.

After receiving aggregate test results 434 and/or 450, processor 410 may perform one or more additional actions 452. For example, processor 410 may diagnose the reported problem and/or may perform a remedial action, such as: repairing or fixing the reported problem, modifying a configuration of one or more computer network devices in or associated with the network, providing a report or an alert, etc.

While FIG. 4 illustrates communication between components using unidirectional or bidirectional communication with lines having single arrows or double arrows, in general the communication in a given operation in this figure may involve unidirectional or bidirectional communication. Moreover, while FIG. 4 illustrates operations being performed sequentially or at different times, in other embodiments at least some of these operations may, at least in part, be performed concurrently or in parallel.

We now further describe embodiments of the communication techniques. In field deployments, an access point often faces numerous issues related to communication performance, such as throughput or another communication-performance issue for an access point.

In order to troubleshoot such issues, challenges/problems may occur when performing testing, such as: a feed test (which measures packet loss and performance issues), a speed test (which measures bandwidth), diagnosing a specific component (hardware and/or software) that is causing an issue by providing a continuous flow of wireless packets from a source to a sink (with other computer network devices acting as passthroughs), etc. Notably, there is often a need for additional human, hardware and/or software resources for the testing/troubleshooting and to approval for network access during the troubleshooting. For example, a wireless access point is a bridge that joins wireless and wired technologies together. In order to troubleshoot the connectivity or communication performance issues on the wireless side, a wireless client, station or host typically needs to be associated with a wireless local area network (WLAN) having a service set identifier (SSID) provided by an access point that is withing wireless communication range. Similarly for the wired side of the network, a wired client or host typically needs to be attached to a common switch where the access point is connected to the network.

However, establishing these associations and connections often pose challenges that require additional human, hardware and/or software resources to be deployed in order to facilitate debugging or a service. For example, additional software may need to be installed on the wireless and wired clients. This additional software may need to be calibrated and controlled by a user in order to obtain the desired results. In addition to the capital equipment costs, these additional resources may incur additional operating expenses in the debugging process.

The disclosed communication techniques address these problems by leveraging the fact that most access points are not installed in isolation. Instead, access points are typically installed in groups in a given area, so that they have overlapping wireless signals, which adds or facilitates client roaming. Notably, access points are usually positioned in such a way that at a minimum each wireless client should be able to associate to the WLANs of at least two access points at any point of time, so that in the event that the wireless signal strength of a WLAN from a first access point goes down, the wireless client can associate with an alternate WLAN from a second access point. This approach for positioning access points facilitates roaming and these access points are sometimes referred to as 'neighboring access points.'

Neighboring access points may be used in the communication techniques, which may eliminate the need for a separate client in the testing. For example, during the testing, a first access point (AP-1) may be in a client mode and may associate with the second access point (AP-2), which may be a system-under test (SUT) access point. Similarly, another neighboring access point (AP-3) connected over a wired port of a common switch with AP-1 and AP-2 may be selected as a wired host/client.

In general, the group of access points in the communication techniques may include two or more access points. Relative to AP-2, the neighboring access points may be selected based at least in part on one or more criteria, such as: an access point with a highest received signal strength, an access point with a lowest received signal strength, an access point with median received signal strength, or another signal-strength criterion.

Because a controller of AP-1, AP-2 and AP-3 knows that these access points are in proximity to each other (e.g., they are connected to a common switch) via neighbor information, the controller may set up the testing by providing instructions to AP-1, AP-2 and/or AP-3. For example, the controller may send instructions to AP-1, AP-2 and/or AP-3, including instructions for which test results to report and where to report the test results. In some embodiments, the test results are collected by and reported to the controller by AP-2. However, in other embodiments, AP-1, AP-2 and AP-3 may each report test results to the controller.

Moreover, the client and server software used to validate the throughput and communication performance of the SUT access points (such as AP-2 and AP-3) may be installed in AP-1, AP-2 and AP-3. As noted previously, a controller or a management entity may send the configuration to AP-1, AP-2 and/or AP-3 to run the performance software in client and server mode. For example, as noted previously, during the testing AP-1 may associate with AP-2 and may perform wireless testing, and AP-3 may perform wired testing with AP-2. Note that the testing of AP-2 by AP-1 and AP-3 may be performed serially or in parallel. The necessary scripts or output of the test results may be collected by AP-1, AP-2 and/or AP-3 and consolidated or aggregate test results may be provided to the controller. Then, controller may generate a report based at least in part on the test results to evaluate the throughput and communication-performance capability of the SUT AP (AP-2).

In some embodiments, the testing may be divided into a series of tests that facilitates an end-to-end assessment of communication performance, e.g., of AP-2. For example, the testing may include: communication-performance testing, authentication testing, association testing, DHCP testing, user-authentication testing and/or DNS testing.

Moreover, in some embodiments, the testing by AP-1, AP-2 and/or AP-3 may be initiated by the controller or another computer. For example, testing for problem solving may be triggered by customer service, while testing for service validation may be triggered by analytics. Note that the testing can be on-demand or may be scheduled. In addition, note that the testing may be performed without AP-1, AP-2 and/or AP-3 having to drop existing associations or connections with clients or stations.

The communication techniques may eliminate the need for additional human resources and/or hardware resources for the service validation. Instead, the complete configuration and provisioning of this feature may be automated and may be run or performed multiple times to generate statistical reports. Note that the reports may be run on-demand or periodically to generate data insights that can be used for analytics. Moreover, the use of separate access points in the communication techniques may reduce the resources needed in a given access point, and may avoid interference and/or latency during the testing. Consequently, the communication techniques may reduce the cost, time and complexity of diagnosing and addressing communication problems in customer deployments.

Figure 5:
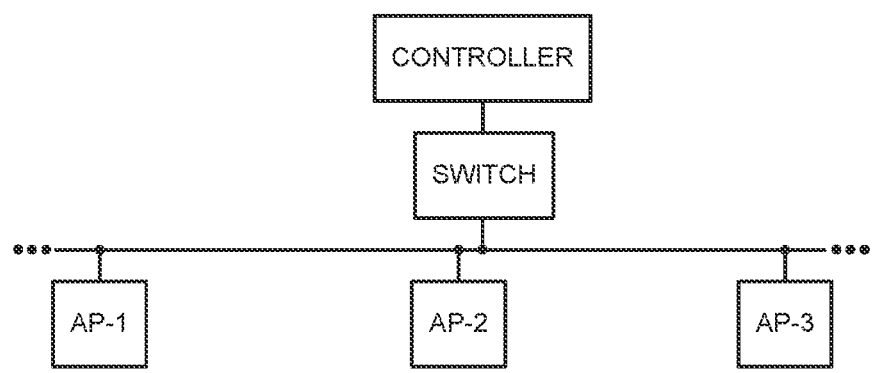
FIG. 5 is a drawing illustrating an example of selectively performing testing using a group of access points in accordance with an embodiment of the present disclosure.

FIG. 5 presents a drawing illustrating an example of selectively performing testing of a group of access points, including AP-1, AP-2 and AP-3. As shown in FIG. 5, the group of access points may be connected to a common switch and may have the same controller. Note that AP-1 may be a neighboring access point to AP-2 that has the best received signal-strength indication (RSSI) or signal-to-noise ratio with AP-2, and may connect to or associated with the WLAN of AP-2 as a client during wireless testing of AP-2 (which is the SUT). Moreover, AP-3 may act as a server during wired testing of AP-2.

While the preceding discussion illustrated the communication techniques in the context of a reported communication problem, in other embodiments the communication techniques may be used to assess communication performance of one or more components in a network even when a customer has not reported a problem. Such as assessment may allow proactive modification of, e.g., a configuration to further improve the communication performance without requiring customer action.

In a first use case, a school may be planning to have in-person testing. Students may be expected to take an exam from various classrooms and tests may be delivered via the Internet. Consequently, it may be important for the students to connect their electronic devices to the Internet. In this case, the school would like to be prepared and may run tests to confirm that all access points are able to accept wireless connections, reach the Internet and download/upload data. If a school wide test needs to be run, it is likely that a school may be defined as a zone. A controller for this zone may orchestrate a test in which neighboring access points connect to a classroom access point and reaches the Internet. This may need to be repeated for all classrooms.

Alternatively, in a second use case, when schools have in person learning and students are not able to connect to the Internet, they may interrupt the class and precious learning time may be lost. An information technology department may be called and the description of the problem may be: "the Internet is down in classroom X." In this case, an analytics team from a provider of the access point may be able to run a diagnostic test to confirm if there is indeed a problem. This may involve placing the access point in the classroom as an access point under test (or SUT) and converting one of the neighbor access points to a station or client mode, so that this access point sinks traffic (such as: voice, video, data, etc.). Testing may then be run from the station-mode access point to access point under test to confirm connectivity to the Internet.

Figure 7:
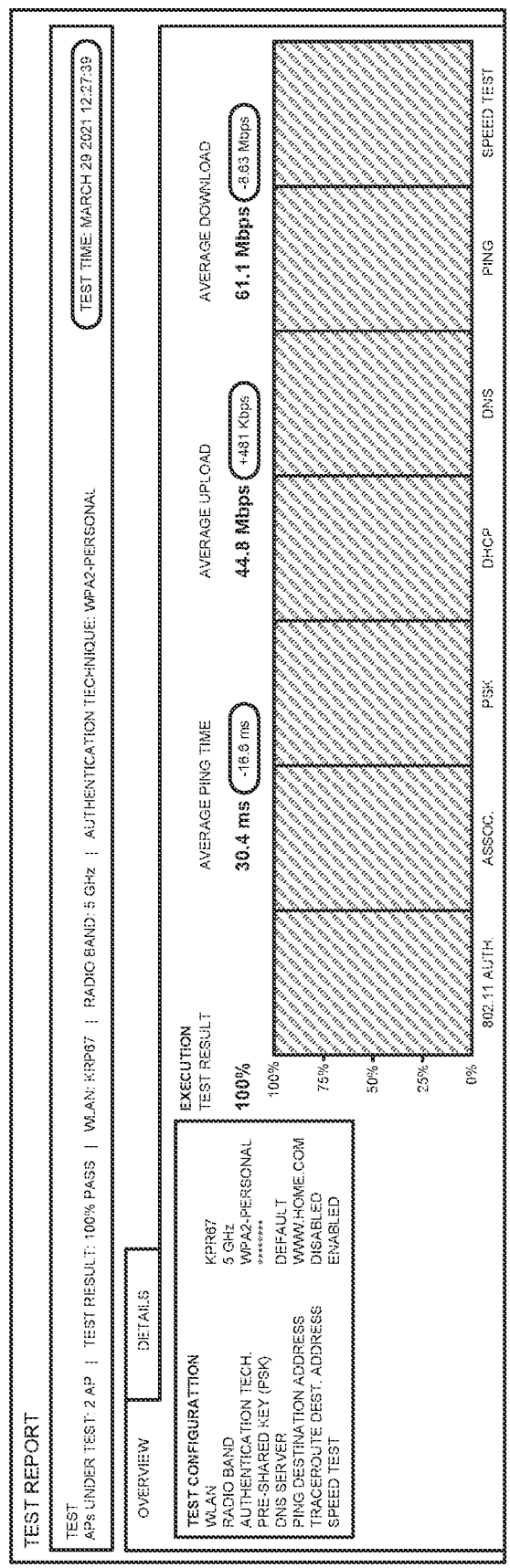
FIG. 7 is a drawing illustrating an example of a test-result user interface in accordance with an embodiment of the present disclosure.

FIGS. 6-8 presents drawing illustrating examples of a test-result user interface that summarize test results obtained using the communication techniques.

We now describe embodiments of an electronic device, which may perform at least some of the operations in the communication techniques. FIG. 9 presents a block diagram illustrating an example of an electronic device 900 in accordance with some embodiments, such as one of: base station 108, one of electronic devices 110, computer 112, one of access points 116, one of radio nodes 118 or switch 128. This electronic device includes processing subsystem 910, memory subsystem 912, and networking subsystem 914. Processing subsystem 910 includes one or more devices configured to perform computational operations. For example, processing subsystem 910 can include one or more microprocessors, graphics processing units (GPUs), ASICs, microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include DRAM, static random access memory (SRAM), and/or other types of memory. In some embodiments, instructions for processing subsystem 910 in memory subsystem 912 include: one or more program modules or sets of instructions (such as program instructions 922 or operating system 924, such as Linux, UNIX, Windows Server, or another customized and proprietary operating system), which may be executed by processing subsystem 910. Note that the one or more computer programs, program modules or instructions may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as antenna nodes 908, e.g., a metal pad or a connector, which can be coupled to the one or more antennas 920, or nodes 906, which can be coupled to a wired or optical connection or link. Thus, electronic device 900 may or may not include the one or more antennas 920. Note that the one or more nodes 906 and/or antenna nodes 908 may constitute input(s) to and/or output(s) from electronic device 900.) For example, networking subsystem 914 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 900 may be adapted or changed using pattern shapers (such as directors or reflectors) and/or one or more antennas 920 (or antenna elements), which can be independently and selectively electrically coupled to ground to steer the transmit antenna pattern in different directions. Thus, if one or more antennas 920 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Moreover, electronic device 900 may include a user-interface subsystem 930, such as: a mouse, a keyboard, a trackpad, a stylus, a voice-recognition interface, and/or another human-machine interface. In some embodiments, user-interface subsystem 930 may include or may interact with a touch-sensitive display in display subsystem 926.

Electronic device 900 can be (or can be included in) any electronic device with at least one network interface. For example, electronic device 900 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments instructions 922 is included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914 and/or of electronic device 900. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   an interface circuit configured to communicate with a computer and a second access point using a wired communication protocol, and
   a second interface circuit configured to communicate with the second access point or a third access point using a wireless communication protocol, wherein the access point is configured to perform operations comprising:
   receiving, associated with the computer, information that specifies a group of access points in a network, wherein the group comprises the access point and the second access point, or the access point, the second access point and the third access point, and wherein the group of access points are proximate to each other in the network;
   receiving, associated with the computer, instructions for testing to conduct with the second access point or the second access point and the third access point, wherein the testing comprises wired communication with the second access point, and wireless communication with the second access point or the third access point;
   performing, based at least in part on the information and the instructions, the testing with the second access point or the second access point and the third access point; and
   providing, addressed to the computer, test results associated with the access point.

2. The access point of claim 1, wherein proximity of the group of access points to each other in the network comprises: the second access point or the third access point being within wireless-communication range of the access point; or the group of access points sharing a switch in the network, a router in the network or the controller.

3. The access point of claim 1, wherein the computer comprises a controller.

4. The access point of claim 1, wherein the operations comprise:
   receiving second test results associated with the second access point or the third access point; and
   providing, addressed to the computer, the second test results.

5. The access point of claim 4, wherein the instructions specify that the second test results are to be reported to the access point by the second access point or the third access point.

6. The access point of claim 1, wherein the testing is performed in an automated manner.

7. The access point of claim 1, wherein the testing is performed without human involvement.

8. The access point of claim 1, wherein the operations comprise receiving, associated with the computer or a second computer, a trigger that initiates the testing.

9. The access point of claim 1, wherein the testing comprises: communication performance using the wireless communication protocol; authentication testing; association testing; dynamic host control protocol (DHCP) testing; user-authentication testing; or domain name system (DNS) testing.

10. The access point of claim 1, wherein the operations comprise, during the testing that comprises wireless communication with the second access point or the third access point, associating with the second access point or the third access point; and
   wherein, when associated, the second access point or the third access point are a client of the access point.

11. A non-transitory computer-readable storage medium for use in conjunction with an access point, the computer-readable storage medium storing program instructions that, when executed by the access point, cause the access point to perform operations comprising:
   receiving, associated with a computer, information that specifies a group of access points in a network, wherein the group comprises the access point and a second access point, or the access point, the second access point and a third access point, and wherein the group of access points are proximate to each other in the network;
   receiving, associated with the computer, instructions for testing to conduct with the second access point or the second access point and the third access point, wherein the testing comprises wired communication with the second access point, and wireless communication with the second access point or the third access point;
   performing, based at least in part on the information and the instructions, the testing with the second access point or the second access point and the third access point; and
   providing, addressed to the computer, test results associated with the access point.

12. The non-transitory computer-readable storage medium of claim 11, wherein proximity of the group of access points to each other in the network comprises: the second access point or the third access point being within wireless-communication range of the access point; or the group of access points sharing a switch in the network, a router in the network or the controller.

13. The non-transitory computer-readable storage medium of claim 11, wherein the operations comprise:
   receiving second test results associated with the second access point or the third access point; and
   providing, addressed to the computer, the second test results.

14. The non-transitory computer-readable storage medium of claim 13, wherein the instructions specify that the second test results are to be reported to the access point by the second access point or the third access point.

15. The non-transitory computer-readable storage medium of claim 11, wherein the testing is performed in an automated manner.

16. The non-transitory computer-readable storage medium of claim 11, wherein the operations comprise receiving, associated with the computer or a second computer, a trigger that initiates the testing.

17. The non-transitory computer-readable storage medium of claim 11, wherein the operations comprise, during the testing that comprises wireless communication with the second access point or the third access point, associating with the second access point or the third access point; and
    wherein, when associated, the second access point or the third access point are a client of the access point.

18. A method for selectively performing testing, comprising:
    by an access point:
    receiving, associated with a computer, information that specifies a group of access points in a network, wherein the group comprises the access point and a second access point, or the access point, the second access point and a third access point, and wherein the group of access points are proximate to each other in the network;
    receiving, associated with the computer, instructions for the testing to conduct with the second access point or the second access point and the third access point, wherein the testing comprises wired communication with the second access point, and wireless communication with the second access point or the third access point;
    performing, based at least in part on the information and the instructions, the testing with the second access point or the second access point and the third access point; and
    providing, addressed to the computer, test results associated with the access point.

19. The method of claim 18, wherein proximity of the group of access points to each other in the network comprises: the second access point or the third access point being within wireless-communication range of the access point; or the group of access points sharing a switch in the network, a router in the network or the controller.

20. The method of claim 18, wherein the method comprises, during the testing that comprises wireless communication with the second access point or the third access point, associating with the second access point or the third access point; and
    wherein, when associated, the second access point or the third access point are a client of the access point.

\* \* \* \* \*